United States Patent Office 3,510,270
Patented May 5, 1970

3,510,270
RECLAMATION OF LITHIUM ALUMINATE TARGET ELEMENTS
Raymond Cooperstein, Kennewick, Wash., assignor to the United States of America as represented by the United States Atomic Energy Commission
No Drawing. Filed Aug. 10, 1967, Ser. No. 661,167
Int. Cl. C01d 11/02; C01f 7/04
U.S. Cl. 23—308                                                2 Claims

ABSTRACT OF THE DISCLOSURE

Target elements for the production of tritium by neutron irradiation in a nuclear reactor are reclaimed. The target elements comprise sintered pellets of lithium aluminate sealed in aluminum cans. In order to reclaim the pellets, the target elements are heated to a temperature in the range 675°–900° C., thereby melting the aluminum, which is drained away from the pellets without affecting the integrity of the pellets.

CONTRACTUAL ORIGIN OF THE INVENTION

This invention was made in the course of or under a contract with the United States Atomic Energy Commission.

BACKGROUND

One method for the production of tritium is the irradiation of lithium aluminate "target elements" by neutrons in a nuclear reactor. These target elements comprise sintered cylindrical lithium aluminate pellets sealed in tightly fitting aluminum cans. The fabrication of the target elements may be summarized as follows: Lithium aluminate powder is conditioned for fabrication, formed by cold pressing into green pellet bodies, bisque fired to remove binder and lubricants, and sintered to densify the bisque ware. They are then centerless ground to the specified diameter, sawed to the correct length, stripped of moisture by heating, inserted into aluminum cans, which are sealed by welding on aluminum end caps.

In the subsequent testing an appreciable number of these assemblies are rejected, usually because of defective closures. Since a substantial amount of material and effort has gone into the preparation of acceptable ceramic core pieces, these are reclaimed for reuse in producing new aluminum clad assemblies.

It is necessary that the ceramic pieces fit tightly in the aluminum cans. The ceramic pieces must, therefore, be recovered in an undamaged condition.

Prior to my invention, the reclamation procedure was as follows:

1—Removing an end cap with a pipe cutter.
2—Slitting the can lengthwise with a tube slitter, forming two sets of parallel slits 180° apart.
3—Manually peeling the slit strips with a pair of pliers.
4—Discharging the pellets from the remains of their casings.

This procedure was slow and cumbersome and resulted in the destruction of a high proportion of the pellet stacks due to disassembly operations, particularly the slitting and peeling steps.

SUMMARY OF THE INVENTION

I have found that temperatures of 675° to 900° C., molten aluminum does not wet lithium aluminate and will drain cleanly away from it, leaving the surface essentially bare.

I, therefore, reclaim the ceramic pellets from aluminum-clad target elements by heating them to a temperature in the range of 675° to 900° C., thereby melting the aluminum, and draining away the molten aluminum. The pellet stacks are undamaged and are then available for direct recanning.

SPECIFIC EMBODIMENT

The target elements are normally stood on end on an iron grate. In order to avoid collection of metal on the flat upper end, it is desirable to remove the end cap from that end of each target element.

The elements are heated to a temperature in the range 675°–900° C. The molten aluminum drains through the grate, preferably into a removable pot of graphite or ceramic. It has been found that there is no erosion of or reaction with the lithium aluminate and virtually no adherence of aluminum. A few small spots, covering a fraction of a percent of the surface may have a very thin coating of aluminum. After cooling, the pellets can be inserted directly into aluminum cans for refabrication of the target assembly.

Various changes may be made in the process just described. For example, the elements may be supported in an inclined, rather than a vertical position. This is less convenient in itself, but since it eliminates all horizontal surfaces it makes it unnecessary to cut off the end caps. The elements may also be laid on their sides.

The embodiments of the invention in which an exclusive property or privilege is claimed is defined as follows:

1. In the reclamation of lithium aluminate target elements, said elements comprising cylindrical pellets of lithium aluminate sealed in tightly fitting aluminum cans, the improvement comprising heating said elements to a temperature in the range 675° to 900° C., thereby melting the aluminum, and draining away the molten aluminum from the lithium aluinmate pellets.

2. The process as defined in claim 1, wherein prior to the heating the end cap is removed from one end of each element, thereby exposing the lithium aluminate at said end, and, during the heating the elements are supported in an upright position with the exposed ends uppermost.

References Cited

UNITED STATES PATENTS

| | | | |
|---|---|---|---|
| 2,901,343 | 8/1959 | Peterson | 23—324 X |
| 3,100,184 | 8/1963 | Abraham | 176—16 |
| 3,119,658 | 1/1964 | Schulz | 23—324 X |
| 3,382,046 | 5/1968 | Faugeras | 23—267 |
| 3,409,413 | 11/1968 | Burns | 23—324 |

FOREIGN PATENTS

| | | |
|---|---|---|
| 1,089,080 | 8/1960 | Germany. |
| 39/27,173 | 11/1964 | Japan. |

NORMAN YUDKOFF, Primary Examiner
S. J. EMERY, Assistant Examiner

U.S. Cl. X.R.
23—52, 324; 75—65; 176—16